Feb. 17, 1970  C. D. MacCRACKEN  3,495,415
METHOD FOR PREPARING AND MAINTAINING ICE SKATING RINKS
Filed Dec. 24, 1968  3 Sheets-Sheet 2
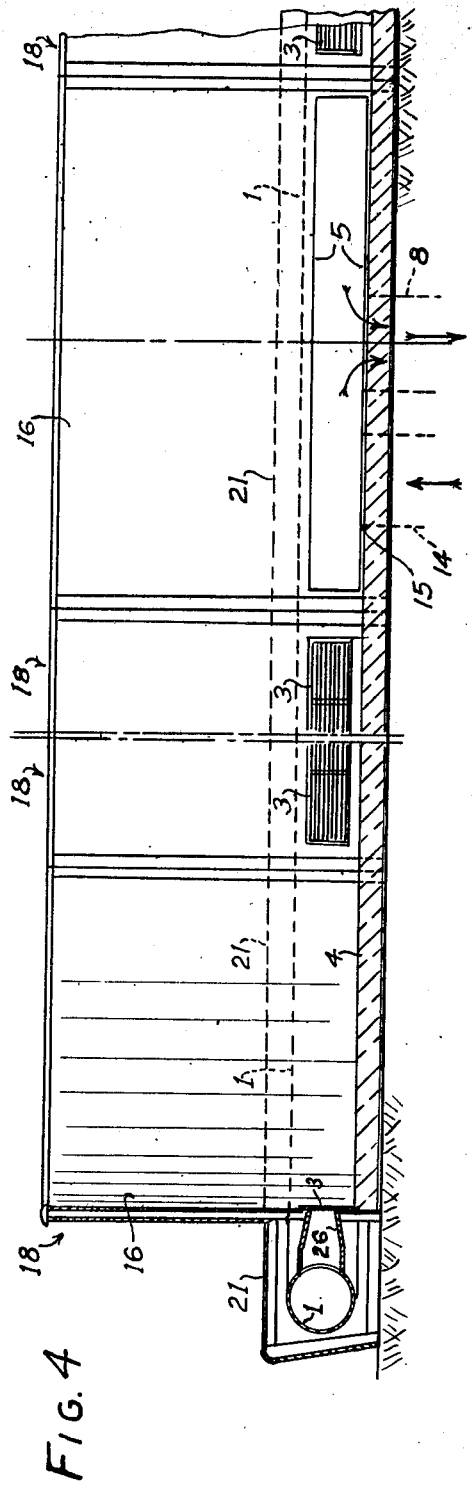
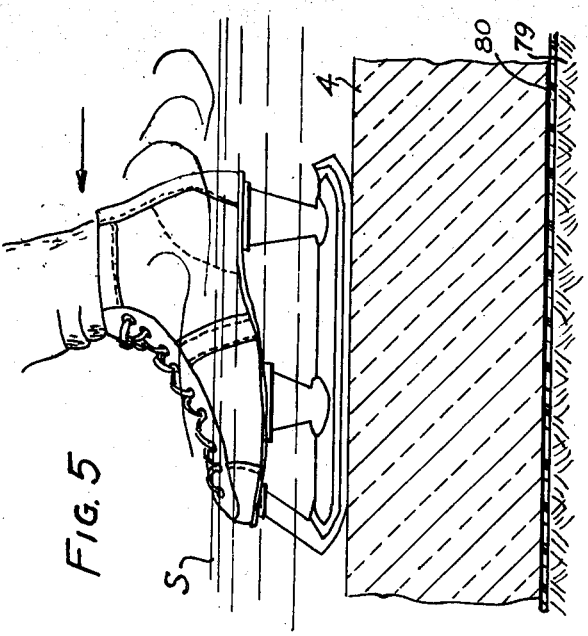
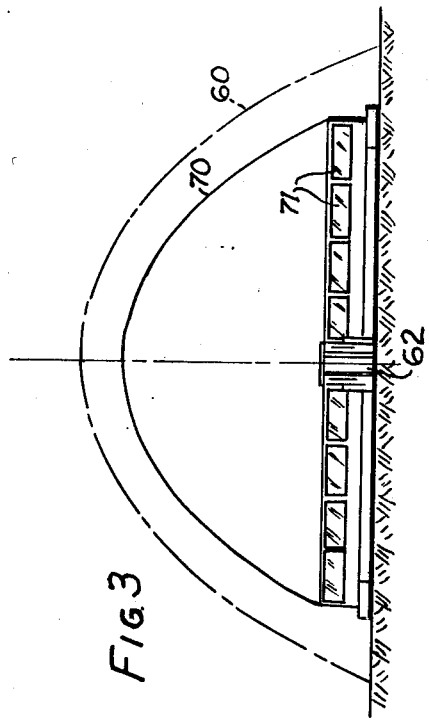
INVENTOR.
CALVIN D. MAC CRACKEN
BY
Robertson Bryan Parmelee & Johnson
ATTORNEYS

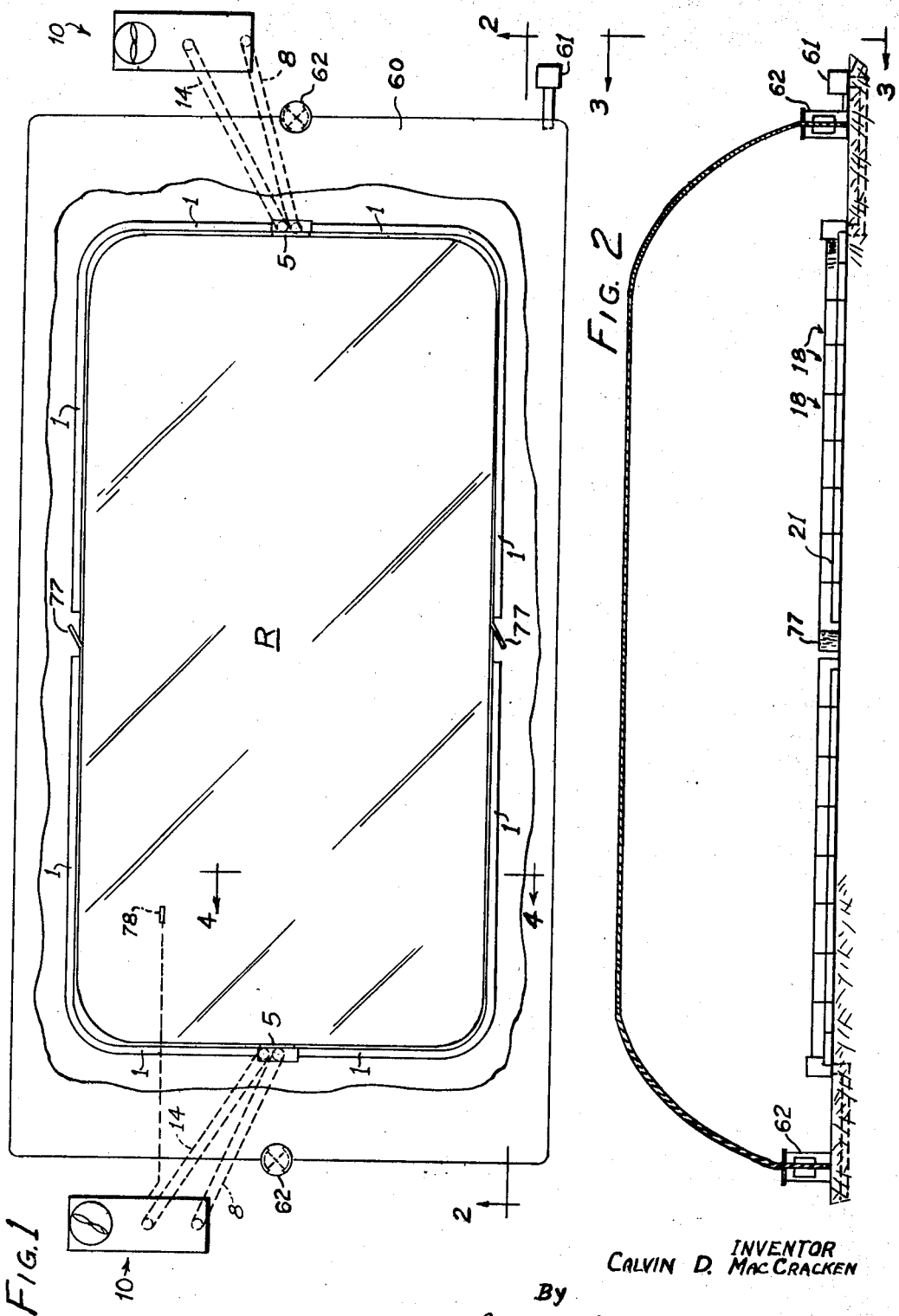

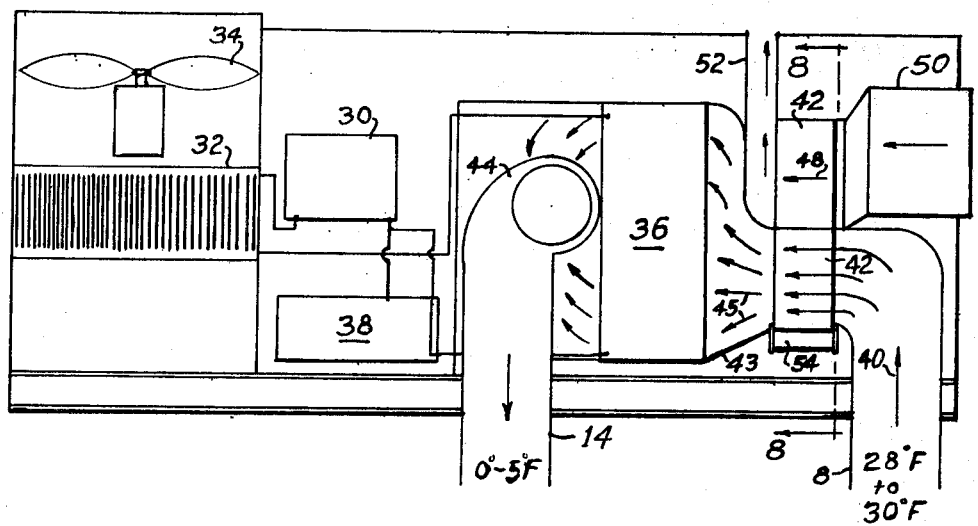
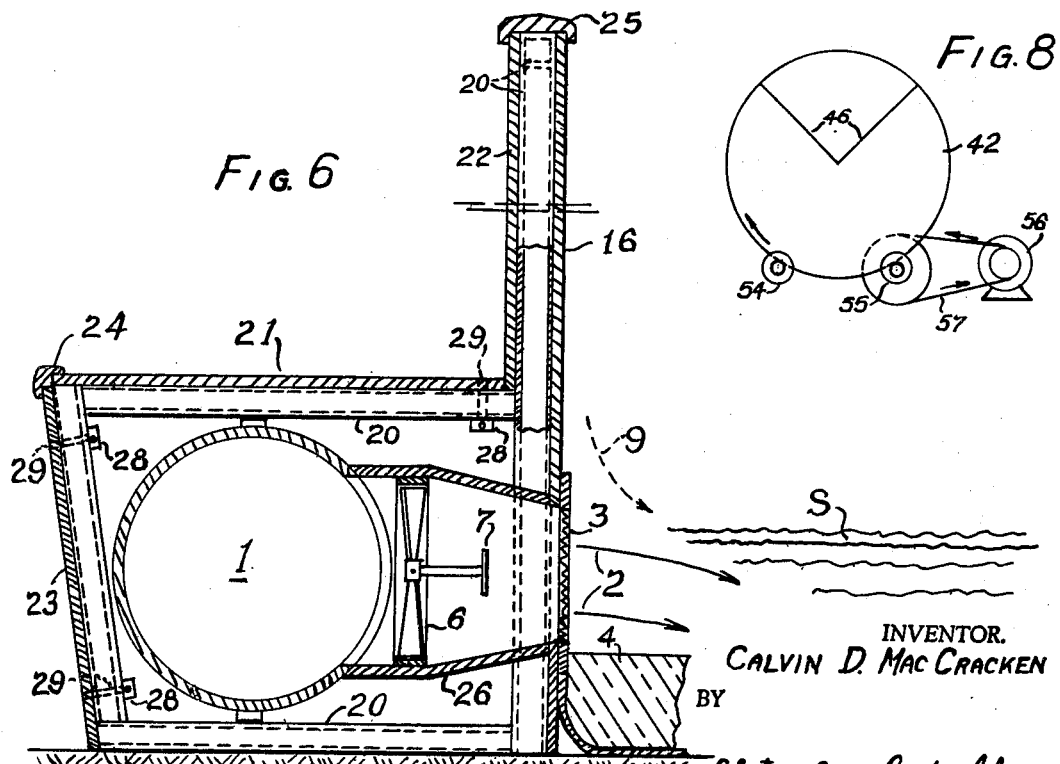

United States Patent Office 3,495,415
Patented Feb. 17, 1970

3,495,415
METHOD FOR PREPARING AND MAINTAINING ICE SKATING RINKS
Calvin D. MacCracken, Englewood, N.J., assignor to Calmac Manufacturing Corporation, Englewood N.J.
Continuation-in-part of application Ser. No. 561,308, June 9, 1966. This application Dec. 24, 1968, Ser. No. 786,603
Int. Cl. F25c 3/02; A63c 19/10
U.S. Cl. 62—74                15 Claims

ABSTRACT OF THE DISCLOSURE

Method and apparatus for preparing and maintaining ice skating rinks in which air is refrigerated to a temperature in the range below 10° F. and preferably below 5° F. and above a lower limit of approximately 0° F. and is supplied at a low velocity from multiple outlets spaced around the major portion of the periphery of the skating area at a level closely adjacent to the surface of the ice to create an abruptly stratified blanket of cold air in contact with the ice. The velocity of the refrigerated air discharged from these outlets onto the ice is held to a low level which in one successful embodiment is about 5.0 feet per second to avoid the entrainment of ambient air from above, and the return air is drawn from a level below 8 inches and preferably below 6 inches above the surface of the built up ice, so as to be withdrawn from the blanket mass thus maintaining an abruptly stratified blanket of cold air of low moisture content in contact with the ice. It is not necessary to shave the ice to keep it less than one to one and a half inches thick, as is required in conventional rinks using sub-floor piping-grid refrigerating systems, and in fact the ice is allowed to build up to a thickness of at least 3 inches and preferably in the range from 3 to 8 inches thick. Conveniently portable modular dasher boards are interconnected to form the rink and lay out the supply ducts and grilles for the refrigerated air. A special air refrigerating coil and moisture removing arrangement is disclosed, and an air supported enclosure may be used to house the rink.

---

Continuation-in-part-of application Ser. No. 561,308, filed June 9, 1966.

The invention relates to method and apparatus for preparing and maintaining ice skating rinks.

It is usual in the construction of ice skating rinks to make the ice for the skating surface by a method which entails laying down a grid of piping which forms the cooling part of a conventional refrigerating system. The rink will ordinarily be housed in an arena type of building. This is virtually the whole story of the ice skating rink construction from the beginning. Such rinks have been so expensive that their use have been largely confined to large urban centers where they are used for professional hockey games or to parks in outlying areas where the costs can be defrayed by public funds or by private funds amortized through admission fees. Elsewhere the cost of constructing and maintaining ice skating rinks has, for the most part precluded their use by smaller municipalities or by schools and colleges with of course some exceptions where endowments of the institutions are sufficiently great.

Basically the principal cost burdens are those of building the sheltering arena and of providing the refrigeration plant with its extensive system of piping spreading under the entire skating area. In addition, it is necessary to use expensive shaving equipment periodically to shave the ice to make sure that the ice remains thin, usually one to one and a half inches thick, because the refrigeration occurs from the system of piping under the skating area. Thus, the layer of ice must be kept thin to facilitate heat transmission from the surface down through the ice to the grid of pipes in the floor.

SUMMARY

I have found a way of freezing and maintaining a skating surface without using such an expensive piping system, within a weatherbreak structure. Such weatherbreak may be only a flexible enclosure supported by pressurized air. If desired, a permanent structure may be used to house the skating area, while employing the present invention to advantage. In colder climates nature has known how to make a skating rink of a pond or lake or river for perhaps a few good days in the average winter through the ordinary freezing action of the ambient atmosphere.

The prior art has suggested that an ice skating rink can be maintained by insulating a building with insulation several inches in thickness and by refrigerating the entire interior of the building. Such a refrigerated building system is impractical because it requires a tremendous amount of refrigeration capacity, being an attempt essentially to duplicate cold weather indoors during warmer weather outdoors. Also, this refrigerated building system would be most uncomfortable to spectators and also uncomfortable to skaters because of the cold air throughout the building. In contrast to this prior art, the illustrative embodiment of the invention utilizes an uninsulated air-supported enclosure which is only about ⅛ of an inch thick. The present invention does not require an insulated building, and the temperature of the air throughout the enclosure generally is at a comfortable level above the ice temperature. It has been an object of my invention to discover the means of freezing a skating surface without the use of ice piping and in a manner to permit making and holding skating ice during the major portion of the winter in temperate climes when temperatures of the ambient atmosphere may rise to as much as 50° F. or higher.

I have found it possible to accomplish these aims with a method that comprises the steps of:

(a) Directing a controlled slow flow of refrigerated air over a predetermined area to reduce the temperature of the area below freezing, (b) Applying water over said frozen area and freezing it, (c) Directing controlled slow flow of refrigerated air over the surface of said area covered with ice, said refrigerated air being at a temperature in the range from 0° F. to 10° F. and substantially denser than the ambient air and being caused to flow at low velocity, less than 9.0 feet per second and preferably about 5.0 feet per second from outlets adjacent to the ice, said refrigerated air flowing slowly along the surface of the ice to form an abruptly defined stratified mass of cold air in contact with the ice, (d) Withdrawing air from said stratified mass at a level closely adjacent to the surface of the ice, (e) Confining the stratified cold air blanket within approximately the limits of said area which is to form the skating rink while shielding the stratified mass against disturbance by wind, (f) Withdrawing moisture from said withdrawn air, and (g) Refrigerating the air withdrawn from over the ice down to a temperature in the range below 10° F. for recirculation in freshly cooled controlled flow to blanket the ice in a stratified mass of cold air which is replenished.

When this method is followed, what happens is that the skating surface is frozen and maintained in its frozen state by the abruptly stratified blanket of cold air which, because it is relatively dry, produces added cooling by evaporation from the surface of the water or ice, as the case may be.

It was at first thought that such a method could not work, having regard especially to the fact that when large groups of skaters proceed around the rink in the same direction, their bodies must drag behind them a considerable mass of air which could disturb the stratified mass of replenished refrigerated air relied on for cooling and evaporation. It was also thought that the problem would be made worse by the stirring action of the feet and skates of the skaters. To any extent that the skates may break up the mass of stratified air, it becomes immediately replaced by the slow flow of dense, dry, refrigerated air. Thus, it has been found that by following the particular combination of steps outlined above, it is quite feasible to hold the ice by the confined abruptly stratified blanket of stratified cold air even when the temperature of the ambient air goes as high as 50° F. or more.

In its apparatus aspects my invention, first of all, comprises means for performing each of the steps outlined above. More particularly, the means for directing the controlled low velocity flow of refrigerated air comprises discharge ducts extending along substantially the entire perimeter of the rink and arranged to discharge the refrigerated air laterally from the ducts immediately adjacent to the ice surface to create an abruptly stratified blanket of refrigerated cold air of low moisture content lying upon the ice. The controlled flow of the refrigerated air used to replenish the stratified blanket occurs at low velocity so as to avoid the entrainment of any significant amount of warmer ambient air from above. I have found in practice that the method works to advantage when the discharge velocity at the outlets is below 9.0 feet per second. The return ducts extend immediately adjacent to the ice surface along limited portions of the rink's perimeter and the refrigerating means is connected to the discharge and return ducts. The stratified blanket of cold air is contained against outflow by means of a peripheral wall extending around the stratum of refrigerated air.

According to another aspect of my invention the enclosure may be uninsulated, such as one supported by pressurized air, to provide an effective protection against disturbance by wind of the stratified cold air blanket.

According to yet another aspect of my invention the supply ducts for the refrigerated air are located in dasher board modular units which are conveniently fastened together to form the perimeter of the ice skating rink.

Other features and advantages of the invention will appear in the description which follows:

FIG. 1 is a plan view of an ice skating rink constructed according to my invention;

FIG. 2 is a side elevational sectional view of the same taken on line 2—2 of FIG. 1;

FIG. 3 is an end elevational view of the same taken as indicated at 3—3 in FIG. 2, but showing a modified enclosure extending to the top of the dasher boards;

FIG. 4 is an enlarged elevational sectional view taken along the line 4—4 in FIG. 1, showing the dasher boards, refrigerated supply grilles and the return grille at one end of the rink;

FIG. 5 is an enlarged detail cross-section of the thick ice layer on the ground with the stratified mass of refrigerated air resting on the ice.

FIG. 6 is a cross sectional view, shown on enlarged scale, of one of the modular dasher board units containing an adjustable flow supply grille;

FIG. 7 is a side elevational view and schematic circuit diagram of one of the two air drying and refrigeration units; and FIG. 8 is a cross sectional view taken at 8—8 in FIG. 7 and showing the revolving air drying mechanism.

As shown in FIG. 1 my apparatus for preparing and maintaining ice skating rink R comprises a pair of systems of refrigerated air supply ducts 1 extending around substantially the entire perimeter of the rink for directing controlled low velocity flow 2 (FIG. 6) of low temperature refrigerated air over the surface of an area covered with water or ice. In each duct system the return grille is located at the center of one end of the rink, and the supply ducts for the refrigerated air are arranged in a U-shaped pattern extending across the end and along both sides toward the mid points. This pair of systems of ducts 1 is formed by interconnecting modular dasher board unit around the perimeter of rink R, as will be explained in detail further below, each containing the apertures or grilles 3, FIG. 6, for causing such low temperature air to stay directly upon and along the surface of the ice to form an abruptly stratified mass S of cold air in contact with the ice.

The temperature of the refrigerated air is low, being in the range below 10° F. and preferably below 5° F. and above a lower limit of approximately 0° F. as will be explained so as to be a distinctly denser fluid than the ambient air. Also, the refrigerated air is delivered from multiple outlets extending along a substantial portion of the perimeter of the ice rink for replenishing the abruptly stratified mass S with a low velocity flow of dry cold air. I have found out that the abrupt or sharply defined forced stratification principle utilized in this invention is vital to the working of the skating rink in practice. The rate of freezing of the ice depends mostly upon the differential in temperature between the ice 4 (FIG. 5) and the air in the abruptly stratified blanket S. Thus, I have found that the temperature of refrigerated air 2 issuing from the supply grilles 3 (FIGS. 4 and 6) should be in the range below 10° F. and preferably below 5° F. and above a lower limit of approximately 0° F., and that this particular range is critical in order to obtain a sufficiently fast freezing rate for practical operation of a rink in spite of loads caused by crowds, sunshine on the enclosure, or warm ambient air. Thus, the refrigerated air temperature is at least 20° F. below the temperature of the ice slab.

The reason why approximately 0° F. is specified as a lower temperature limit is that in practice attempts to use lower temperatures are frustrated by unpleasant fogging conditions occurring near the interface between the warm moist ambient air above and the sharply defined stratified blanket S. By drying the refrigerated air so that it has substantially less than 100% relative humidity, it is possible to reduce the temperature a few degrees below 0° F. without causing undue fogging.

It is vital that the low velocity supply of refrigerated air 2 be stratified and remain in contact with the ice surface. I have found that the upper limit of 10° F. is the maximum temperature at which a sharply defined and reliable stratification occurs in spite of the presence of a team of hockey players on the ice. The reason why I prefer to hold the outlet supply temperature of the low velocity refrigerated air 2 at a temperature of 5° F. or slightly less, as it begins to move across the ice, is that the stratification is even more pronounced, producing a thinner blanket S which is more sharply defined and more stable and more efficient in freezing the ice.

As a further critical factor in producing the stratified blanket S in a practical system, it is important to take the air into the return grille 5 (FIG. 4) at a very low level using a grille opening having a low height, extending no more than 8 inches above the ice surface and preferably 6 inches or less. The reason why the location level and over-all height of the return grille is critical will now be explained.

I have attempted to use a return grille having an opening extending up to a level of 16 inches above the ice surface. I have found that the temperature of the air entering this sixteen-inch high return grille varied by a differential of as much as 26° F. from its bottom to its top. When I reduced the over-all height of this return grille to eight inches, then I found that the temperature variation from bottom to top was cut down to 8° F. In addition, the average temperature of the return air entering the eight-inch return grille was 7° F. less than the average temperature of the return air entering the sixteen-inch return grille. This reduction in return air temperature has the feedback effect of reducing the temperature of the supply air in the ducts 1 by this amount, or usually more, thus making the whole effect cumulative in establishing and maintaining the stratified blanket S. The reason why the temperature of the air in the supply ducts is usually reduced by more than the amount of reduction in the return temperature is that the amount of moisture is reduced, thus reducing the amount of latent heat.

That is, a further important factor with respect to the level and height of the return grille is that taking colder air into the return grille reduces the absolute amount of moisture which must be removed, thereby reducing the amount of latent heat to be withdrawn, and hence allowing the freezing capacity to be utilized for reducing sensible heat. In the illustrative preferred embodiment an air drier is used, and by following this specification about the location and height of the return opening 5, the air drier becomes even more effective.

When the method and apparatus are put into practice in accordance with the present invention, it will be found that the average temperature of the air entering the two return grilles 5 is 28° F. to 30° F. and the temperature of the refrigerated air issuing from the supply grilles 3 is in the preferred range from 0° F. to 5° F.

For controlling the low velocity flow 2 and for providing uniform distribution, there are adjustable multi-bladed dampers 6 having control handles 7 located for access behind each of the supply grilles 3. The reason for maintaining the velocity of the refrigerated supply air 2 low is to avoid undue entrainment of the warmer air which lies above the stratified blanket S. This low velocity is to prevent undue ambient air entrainment as indicated by the dotted arrow 9. The specific velocity at which undue entrainment occurs may vary, depending upon over-all rink size, ambient air temperature and usage of the rink. However, I have found that holding velocity below about 9.0 feet per second is an advantageous criterion for typical installations. I have found that an objectionable amount of air entrainment 9 occurs when the velocity of the flow 2 is above this value. It is preferable to be at about 5.0 feet per second.

When the refrigerated air is at a temperature, for example of 3° F. (approximately 463° F. above absolute zero), and the ambient air is at a temperature, for example at 40° F. (approximately 500° F. above absolute zero), then the low temperature refrigerated air is a fluid having a density 8.0% greater than the ambient air (neglecting humidity). When the ambient air is at 50° F., the difference in density is 10.2%, thus further aiding in maintaining the stratified blanket (neglecting humidity).

The return openings 5 are located at the center of each end of the rink area R at a level down adjacent to the built up ice surface, and they have an over-all height of no more than 8 inches and preferably no more than 6 inches. The openings 5 are connected to return ducts 8 extending down beneath the floor and out to a pair of air refrigeration units (FIG. 7) outside of the enclosure 12. The aspects of the refrigeration units 10 and of the enclosure 12 will be explained in detail further below.

In an installation for a full size hockey rink R, which measures 85 feet wide by approximately 200 feet long, the return openings 5 are each 90 inches long, and the return duct 8 has a diameter of 20 inches. The two units 10 in this preferred embodiment serve to dry and refrigerate the air down to a temperature in the range below 5° F. to about 0° F. and feed this air back through the respective supply mains 14, each of which has a diameter of 18 inches. These supply mains 14 are each connected through a T connection at 15 (FIG. 4) to the respective systems of supply ducts 1 each extending in a U-shaped pattern around the major portion of the perimeter of one-half of the rink area R.

The apparatus further includes means for confining the stratified cold air mass S within approximately the limits of the surface which is to form the skating rink area R. In the embodiment illustrated, such confining means consists of a peripheral wall 16, FIGS. 1, 4 and 6, extending around the perimeter of the rink and upwardly for at least a few feet above the stratum of refrigerated air. This peripheral wall as shown also serves as the "hockey" or "dasher" boards of a rink to be used in hockey playing. Advantageously, these boards 16 are formed by interconnecting a series of portable, modular, dasher board units 18, the structure of which is most clearly seen in FIGURES 4 and 6.

Each unit 18 is eight feet long and four feet high and has a frame 20 of welded square aluminum tubing to which marine grade plywood panels are bolted to form respectively the wall 16, a seat 21, a seat back 22, and a forwardly inclined riser panel 23 extending up from the floor to the edge of the seat. A molding strip 24 joins the riser to seat, and a rubber capping strip 25 runs along the top of each modular unit 18.

In the space beneath the seat 21 there is a section of the duct 1 formed of glass fiber insulation material having an aluminum foil skin and an inside diameter of 12 inches with polyurethane gaskets at the end for making an air-tight butt joint when the units 18 are connected end-to-end, as shown in FIG. 4. A lateral connection 26 joins the duct section 1 with the supply outlet opening 3. There is such a supply opening 3 in each of the dasher board units 18, and these openings have substantially the same height as the return openings. In this installation these openings measure 30 inches long and 6 inches high, while the two return openings 5 each measure 90 inches by 6 inches.

The individual dasher board units 18 are fastened together by quarter-turn latches 28 which hook together, each having an access hole 29 for insertion of a tool to turn the latch. A rigid wall structure surrounding the rink R is effectuated to resist the impact of hockey players, because the width of the seat 21 forms an effective stiffening beam after the units 18 have been fastened together.

The refrigeration units 10 each include one or more compressors 30 and heat dissipation coil 32 through which the compressed refrigerant is passed to be cooled and condensed by outdoor air drawn by a fan 34.

There is a special air-cooling coil evaporator unit 36 in which the refrigerant is expanded as it returns to a compressor 30 via a receiver 38. The returning air 40 in the return duct 8 passes through a revolving desiccant drier wheel 42 and then is lead by a plenum chamber 43 through the cooling coil 36 and is blown through the supply main 14 by means of a blower 44.

The cooling coil 36 is special in that it contains seventeen rows of coils, i.e. it is seventeen rows deep as measured in the direction of flow of the dry air 45 passing therethrough. It is possible to use fewer rows of coils, but I have found that a depth of twelve rows is only marginal to do the job for cooling the air down to a temperautre below 5° F. Each refrigeration unit 10 has a capacity to provide 7,500 cubic feet per minute (c.f.m.) of air at a temperature below 5° F., and usually at 0° F. in the main line 14, when the returning air 40 has a temperature of 28° F. to 30° F., making a total of 15,000 c.f.m. from the two units 10. In most full size rink installations it is advisable to use more than twelve rows of coils in the air cooler 36.

In a typical rink R the width is 85 feet and the length is 185 to 200 feet with rounded corners, thus providing an ice surface area of about 15,000 square feet. In actual practice using smoke bomb test devices I have found that the stratified blanket S (FIG. 6) is sharply defined having a top surface which occurs at the level of the top of the supply outlet openings 3, namely being about 6 inches thick, when the ice has built up as shown in FIGURE 6. Thus, the combined capacity of the two refrigerating units 10 is sufficient to supply one cubic foot of refrigerated air per minute at a temperature below 5° F. for each square foot of ice surface. In view of the fact that the blanket S is about 6 inches thick when the ice has built up, this means that there is capacity to replenish the entire blanket every 30 seconds.

It is noted that the top of the sharply defined stratification blanket S occurs at the level of the top of the supply and return openings 3 and 5. Thus, before the ice 4 has built up the blanket S is correspondingly thicker.

As discussed above, the supply outlet openings measure 30 inches by 6 inches, providing 1.25 square feet of flow area. There are forty-eight of these openings spaced around a typical rink R, making a total supply flow area of 60 square feet. At a flow rate indicated at 2 (FIG. 6) of 4.17 feet per second (about 5) there are 250 cubic feet of air per second flowing through the openings 3. This amounts to 15,000 c.f.m. as discussed above, which is sufficient to replenish the entire blanket every 30 seconds.

In order to dry the returning air 40, the revolving drier wheel 42 has a honey comb structure containing a desiccant drier which can be reactivated with hot air, and three quarters of its volume is continuously being exposed to conduct the air flow 40. This desiccant wheel absorbs moisture from the air so that it contains less than 10 grains of moisture per pound of dry air. The remaining quarter of the volume of the wheel 42, as indicated by the radial lines 46 is continuously being reactivated by a reactivating flow of hot air 48. This hot air 48 is heated in a gas furnace 50 and is blown out through a passage 52 carrying the removed moisture. The rim of the wheel 42 is supported on rollers 54 and 55, and an electric motor 56 drives the roller 55 through a belt drive 57. This type of desiccant drier can be obtained commercially from Cargocaire Engineering Company of Amesbury, Mass.

The rink is shown housed in a flexible enclosure 60 made of a suitable fabric such as glass fiber reinforced vinyl plastic that is substantially impervious to air and which is supported by pressurized air, provided by a blower 61, FIG. 1, to maintain a slightly higher pressure within the enclosure than without. Suitable means of access, such as provided by the revolving doors 62, make it possible to maintain the higher inside pressure which will hold the enclosure in its inflated state. Enclosure 60 is provided along its edges with anchoring means to make a seal with the ground. Alternatively, enclosure 60 can be replaced with a smaller enclosure 70, FIG. 3, secured directly to the peripheral wall 16 or to a frame forming an upward extension of such wall and provided with glassed-in viewing areas as at 71.

The enclosure 60 or 70 provides an effective windbreak against disturbances of the stratified air mass S within the confining and shielding peripheral wall 16. Efficacy of the confining and shielding wall 16 is further assured by the use of entry doors 77, so that the shield will be continuous.

Finally, such doors have sills which are located substantially above the level of the stratified mass. I have found that 10 inches is a good height for the sills.

A great advantage of this invention is that it is fast and responsive because it puts the cooling action at the upper surface of the ice 4. Cooling power is saved because it is not necessary to keep the units 10 operating all night long. They are turned off when the last skaters leave at night. In the morning there may be a layer of water 1/16–1/8 inch on top of the ice 4. By turning on the units 10 two hours before use, the response is quick and the layer of water is refrozen to a glossy hard surface ready for use. A thermostat 78, FIG. 1, may be buried in the ice to keep the ice temperature below 28° F., if desired.

Another advantage of my invention is that a rink can be formed directly on a bare piece of ground 79, i.e. without any floor or foundation. If desired a plastic sheet 80 can be laid down, but this is not necessary. The formation of the rink can begin with a level area of ground in which the earth is well compacted and smoothed.

Using a system having the capacity of 15,000 c.f.m. of air at a temperature below 5° F., as discussed above, it requires about one day initially to freeze the ground. The ice is built up by spraying water onto the frozen ground, requiring about one day to build up ½ inch of ice. As soon as the ice 4 has built up to 1 inch thickness in the thinnest area (the ground is probably not precisely level) then it is ready for skating.

Due to condensation, the ice continues to build up at a rate of about ⅛ of an inch per day of use. When it has built up to 3 inches or more, the mass of ice provides a "flywheel" effect so as to maintain a skatable surface in spite of large crowds, sunshine and warm temperature.

With the utilization of the construction described, and by following the particular steps I have outlined, it has been found possible to hold good skating ice on a rink of a size large enough to accommodate an ice hockey game, i.e. approximately 85 ft. by 185 ft., using two units 10 of 30 tons each of refrigeration under conditions where the rink is to be used when the temperature of the ambient air at midday rises for short periods to a temperature of as much as 55° to 60° F.

The terms and expressions which I have employed are used in a descriptive and not a limiting sense, and I have no intention of excluding equivalents of the invention described and claimed.

I claim:
1. The method of maintaining an ice slab for skating, said slab resting on a supporting area, such as ground, a plastic layer, a floor or similar supporting area, wherein the ambient temperature is more than 20° F. above the temperature of said ice slab comprising the steps of:
   (1) enclosing said supporting area with a peripheral wall several feet high,
   (2) shielding said supporting area from the wind by enclosing it within a windbreak enclosure,
   (3) providing an abruptly stratified blanket of refrigerated air resting upon said ice slab,
   (4) continuously withdrawing air from the edge of said stratified blanket through said peripheral wall,
   (5) refrigerating the withdrawn air to a temperature at least 20° F. below the temperature of said ice slab, and
   (6) delivering the refrigerated air back through said peripheral wall to other parts of the edge of said stratified blanket to maintain said abruptly stratified blanket for maintaining said ice slab.

2. The method of maintaining an ice slab for skating, said slab resting on a supporting area, as claimed in claim 1, in which said refrigerated air is dried and delivered to said stratified blanket with a moisture content below 10 grains per pound of dry air.

3. The method of maintaining an ice slab for skating, said slab resting on a supporting area, as claimed in claim 1, in which said refrigerated air is delivered back to other parts of said stratified blanket through said peripheral wall at a velocity below 9.0 feet per second and preferably at about 5.0 feet per second.

4. The method of maintaining an ice slab for skating, said slab resting on a supporting area, as claimed in claim 1, in which said refrigerated air is delivered through said peripheral wall at a flow rate in cubic feet per minute which is approximately equal to the surface area of the ice slab in square feet.

5. The method of maintaining an ice slab for skating, said slab resting on a supporting area, as claimed in claim 1, in which said refrigerated air is delivered through said peripheral wall at a flow rate in cubic feet per minute which is sufficient to replenish said stratified blanket in approximately one-half of a minute.

6. The method of maintaining an ice slab on a floor area in a space whose temperature is higher than the freezing point of said ice slab comprising the steps of:
(1) creating an abruptly stratified layer of air below said freezing point, measuring a few inches thick located above and resting directly upon said slab,
(2) enclosing said floor with a peripheral wall several feet high,
(3) shielding said floor area from the wind by enclosing said space within an enclosure,
(4) maintaining the temperature of said stratified layer below the temperature of said space and below said freezing point by continuously withdrawing air from the edge of said layer through said peripheral wall,
(5) refrigerating said withdrawn air to a temperature below 10° F., and
(6) delivering it back to other parts of the edge of said layer through said peripheral wall, thereby replenishing and maintaining said abruptly stratified layer for maintaining the ice slab on said floor area.

7. The method of maintaining an ice slab on a floor area in a space whose temperature is higher than the freezing point of said ice slab as claimed in claim 6, in which:
(7) said refrigerated air is delivered back through said peripheral wall to the edge of said stratified blanket on all four sides of said floor area from locations spaced substantially entirely around the periphery thereof.

8. The method of maintaining an ice slab on a floor area in a space whose temperature is higher than the freezing point of said ice slab as claimed in claim 7, in which:
(8) said refrigerated air is distributed along said peripheral wall in two U-shaped patterns,
(9) each of said U-shaped patterns extending around an end and along part of the sides of said floor area, and
(10) said air is withdrawn from the center of each end of said floor area.

9. The method of maintaining an ice slab on a floor area in a space whose temperature is higher than the freezing point of said ice slab, as claimed in claim 6, in which moisture is removed from said withdrawn air to reduce the moisture content of said refrigerated air delivered through said peripheral wall to below 10 grains of moisture per pound of dry air.

10. The method of maintaining an ice slab on a floor area in a space whose temperature is higher than the freezing point of said ice slab, as claimed in claim 6, in which
(7) said air is withdrawn from the edge of said layer within a level of several inches above the surface of said ice slab, and
(8) said refrigerated air is delivered back through said peripheral wall to the edge of said layer at a level within several inches above the surface of said ice slab.

11. The method of maintaining an ice slab for skating, said slab resting on a supporting area, such as ground, a plastic layer, a floor or similar supporting area, wherein the ambient temperature of the air in the space above said ice slab is more than 20° F. above the temperature of said ice slab comprising the steps of:
(1) enclosing said supporting area with a peripheral wall several feet high,
(2) shielding said supporting area from the wind by enclosing it within an enclosure,
(3) providing an abruptly stratified blanket of refrigerated air resting on said ice slab,
(4) continuously withdrawing air from the edge of said stratified blanket through said peripheral wall,
(5) refrigerating the withdrawn air to at least 20° F. below the temperature of said ice slab,
(6) delivering the refrigerated air back through said peripheral wall to other parts of the edge of said stratified blanket, and
(7) said refrigerated air being delivered through said peripheral wall at a flow rate less than 9.0 feet per second, by virtue of all of which steps an abruptly stratified blanket of refrigerated air is maintained on said ice slab in spite of the fact that the ambient temperature of the air in the enclosed space above said ice slab is more than 20° above the temperature of said slab.

12. The method of maintaining an ice slab for skating, said slab resting on a supporting area, such as ground, a plastic layer, a floor or similar supporting area, wherein the ambient temperature of the air in the space above said ice slab is above the temperature of said ice slab comprising the steps of:
(1) enclosing said supporting area with a peripheral wall several feet high,
(2) shielding said supporting area from the wind by enclosing it within an enclosure,
(3) creating an abruptly stratified blanket of refrigerated air resting upon said ice slab,
(4) continuously withdrawing air from the edge of said stratified blanket through said peripheral wall,
(5) said air being withdrawn through said peripheral wall at a level below 8 inches above the level of the ice slab after it has built up,
(6) refrigerating the withdrawn air to at least 20° F. below the temperature of said ice slab,
(7) delivering the refrigerated air back through said peripheral wall to other parts of the edge of said stratified blanket, and
(8) said refrigerated air being delivered through said peripheral wall at a level which is substantially the same as the level at which said air is withdrawn, by virtue of all of which steps an abruptly stratified blanket of refrigerated air is maintained on said ice slab in spite of the fact that the ambient temperature of the air in the enclosed space above said ice slab is more than the temperature of said slab.

13. The method of preparing and maintaining an ice skating rink upon a supporting area comprising the steps of
(1) surrounding the supporting area with a peripheral wall several feet high,
(2) enclosing said supporting area to exclude wind,
(3) withdrawing air from a level within several inches of said supporting area,
(4) refrigerating the withdrawn air,
(5) supplying the refrigerated air at low velocity at a level within several inches of said supporting area,
(6) continuing steps (3), (4) and (5) until said refrigerated air is at a temperature below 10° F., creating an abruptly stratified layer of air resting on said supporting area and said supporting area is at a temperature below freezing,
(7) spraying water onto the frozen supporting area to build up a slab of ice,
(8) continuing steps (3), (4) and (5) to supply refrigerated air at a temperature below 10° F. and at low velocity to maintain an abruptly stratified layer of air resting on said ice, and
(9) thereby maintaining said slab of ice for skating.

14. The method of preparing and maintaining an ice skating rink as claimed in claim 13 including the steps of sensing the temperature of said slab of ice and maintaining said slab of ice at a temperature below 28° F.

15. The method of maintaining an ice slab on a supporting area in a comfortable space for skating comprising the steps of
(1) surrounding said supporting area with a peripheral wall,
(2) enclosing said space to exclude wind, (3) holding the temperature in said space above freezing so as to be generally comfortable for skating,
(4) withdrawing air from a level within several inches of said supporting area,
(5) refrigerating the withdrawn air to a temperature below 10° F.,
(6) drying the withdrawn air to a relative humidity substantially below 100 percent,
(7) supplying the dried refrigerated air to said supporting area at low velocity at a level within several inches of said supporting area,
(8) thereby creating an abruptly stratified blanket of dry refrigerated air on said supporting area,
(9) freezing an ice layer on said supporting area by said abruptly stratified blanket, and
(10) carrying on steps (3), (4), (5), (6), (7), and (8), to maintain said layer of ice for skating, while holding the temperature in said space above freezing so as to be generally comfortable for skating.

References Cited

FOREIGN PATENTS 421,431  12/1934  Great Britain.

WILLIAM E. WAYNER, Primary Examiner

U.S. Cl. X.R.

62—235